United States Patent
Fujimoto

[11] Patent Number: 6,018,720
[45] Date of Patent: Jan. 25, 2000

[54] DATA DELIVERY METHOD AND SYSTEM THEREFOR

[75] Inventor: Jun Fujimoto, Tokyo, Japan

[73] Assignee: Seta Corporation, Tokyo, Japan

[21] Appl. No.: 08/965,996

[22] Filed: Nov. 7, 1997

[30] Foreign Application Priority Data

Aug. 8, 1997 [JP] Japan .................................. 9-214318

[51] Int. Cl.$^7$ .............................................. G06F 17/00
[52] U.S. Cl. ............................................. 705/26; 395/712
[58] Field of Search ......................... 705/26; 395/200.5, 395/200.51, 200.52, 651, 652, 653, 712; 380/4, 23, 24; 235/379, 380, 382

[56] References Cited

U.S. PATENT DOCUMENTS

| | | | |
|---|---|---|---|
| 4,992,940 | 2/1991 | Dworkin | 705/26 |
| 5,444,861 | 8/1995 | Adamec et al. | 395/712 |
| 5,649,187 | 7/1997 | Hornbuckle | 395/712 |
| 5,710,884 | 1/1998 | Dedrick | 705/26 |
| 5,715,403 | 2/1998 | Stefik | 395/244 |
| 5,727,215 | 3/1998 | Rynaski et al. | 395/712 |
| 5,748,967 | 5/1998 | Nakamura et al. | 395/712 |
| 5,752,040 | 5/1998 | Kaneto et al. | 395/712 |
| 5,761,308 | 6/1998 | Torii et al. | 395/610 |
| 5,761,499 | 6/1998 | Sonderegger | 380/24 |
| 5,809,145 | 9/1998 | Silk et al. | 380/25 |

*Primary Examiner*—Allen R. MacDonald
*Assistant Examiner*—Romain Jeanty
*Attorney, Agent, or Firm*—Oliff & Berridge, PLC

[57] ABSTRACT

A purchaser purchases a purchaser record medium, to which game software is rewritten or reloaded, at a shop. The purchaser writes data representing a predetermined amount of money to the purchaser record medium. At that time, the purchaser also writes purchaser inherent data to the purchaser record medium. When game software is requested from a computer of the shop, data recorded in the purchaser record medium is sent to software deliverers through communication networks, and is collated with past data recorded in computers. If matched, the game software is delivered from the software deliverer to the shop, and is then recorded in the purchase record medium. Simultaneously, additional data relating to the game software is recorded in the purchase record medium and in the computers of the software deliverers.

10 Claims, 5 Drawing Sheets

PI/A:PURCHASER'S INHERENT-DATA/ACCOUNTING-DATA

FIG.3

| Z2 | DATA FORMAT FOR PURCHASE HISTORY | | EXAMPLE OF PURCHASE HISTORY DATA |
|---|---|---|---|
| A1. | TITLE OF PURCHASED SOFTWARE | → | a1. STRONGEST SHOGI 1997 |
| A2. | PRICE OF PURCHASED SOFTWARE | | a2. 5800 |
| A3. | SHOP HAVING SOLD SOFTWARE | | a3. THE CONVENIENCE KAMATA BRANCH STORE |
| A4. | DATE AND TIME OF PURCHASE | | a4. 199704101625 |
| A5. | NO. OF WRITE MACHINE | | a5. 00002537 |
| B1. | TITLE OF PURCHASED SOFTWARE | → | b1. BEST GOLF NAGANO PREFECTURE |
| B2. | PRICE OF PURCHASED SOFTWARE | | b2. 4900 |
| B3. | SHOP HAVING SOLD SOFTWARE | | b3. MARUDAI DEPARTMENT STORE SHINJUKU BRANCH STORE |
| B4. | DATE AND TIME OF PURCHASE | | b4. 199705051138 |
| B5. | NO. OF WRITE MACHINE | | b5. 00000271 |
| C1. | TITLE OF PURCHASED SOFTWARE | → | c1. MAH-JONG LI-ZHI IPPATSU |
| C2. | PRICE OF PURCHASED SOFTWARE | | c2. 5500 |
| C3. | SHOP HAVING SOLD SOFTWARE | | c3. YOTSUKOSHI DEPARTMENT STORE SHIBUYA BRANCH STORE |
| C4. | DATE AND TIME OF PURCHASE | | c4. 199706202157 |
| C5. | NO. OF WRITE MACHINE | | c5. 00005963 |

FIG.4

Z3 PURCHASER'S INHERENT-DATA / ACCOUNTING-DATA FORMAT

EXAMPLE OF PURCHASER'S INHERENT-DATA/ACCOUTING-DATA

PURCHASER'S INHERENT DATA:
- D1. ID NUMBER → d1. ST781249
- D2. PASSWORD → d2. 7298
- D3. DATE OF PURCHASER'S BIRTH → d3. 1959.2.23
- D4. DISTINCTION OF SEX → d4. 0

ACCOUNTING DATA:
- E1. DATE OF ACCOUNTING → e1. 199704101620
- E2. AMOUNT OF DEPOSITED MONEY → e2. 20000
- E3. AMOUNT OF PAID MONEY → e3. 0
- E4. BALANCE → e4. 20000
- E5. SHOP HAVING ACCOUNTED → e5. THE CONVENIENCE KAMATA BRANCH STORE

- F1. DATE OF ACCOUNTING → f1. 199704101625
- F2. AMOUNT OF DEPOSITED MONEY → f2. 0
- F3. AMOUNT OF PAID MONEY → f3. 5800
- F4. BALANCE → f4. 14200
- F5. SHOP HAVING ACCOUNTED → f5. THE CONVENIENCE KAMATA BRANCH STORE

- G1. DATE OF ACCOUNTING → g1. 199705051138
- G2. AMOUNT OF DEPOSITED MONEY → g2. 0
- G3. AMOUNT OF PAID MONEY → g3. 4900
- G4. BALANCE → g4. 9300
- G5. SHOP HAVING ACCOUNTED → g5. MARUDAI DEPARTMENT STORE SHINJUKU BRANCH STORE

- H1. DATE OF ACCOUNTING → h1. 199706202157
- H2. AMOUNT OF DEPOSITED MONEY → h2. 0
- H3. AMOUNT OF PAID MONEY → h3. 5500
- H4. BALANCE → h4. 3800
- H5. SHOP HAVING ACCOUNTED → h5. YOTSUKOSHI DEPARTMENT STORE SHIBUYA BRANCH STORE

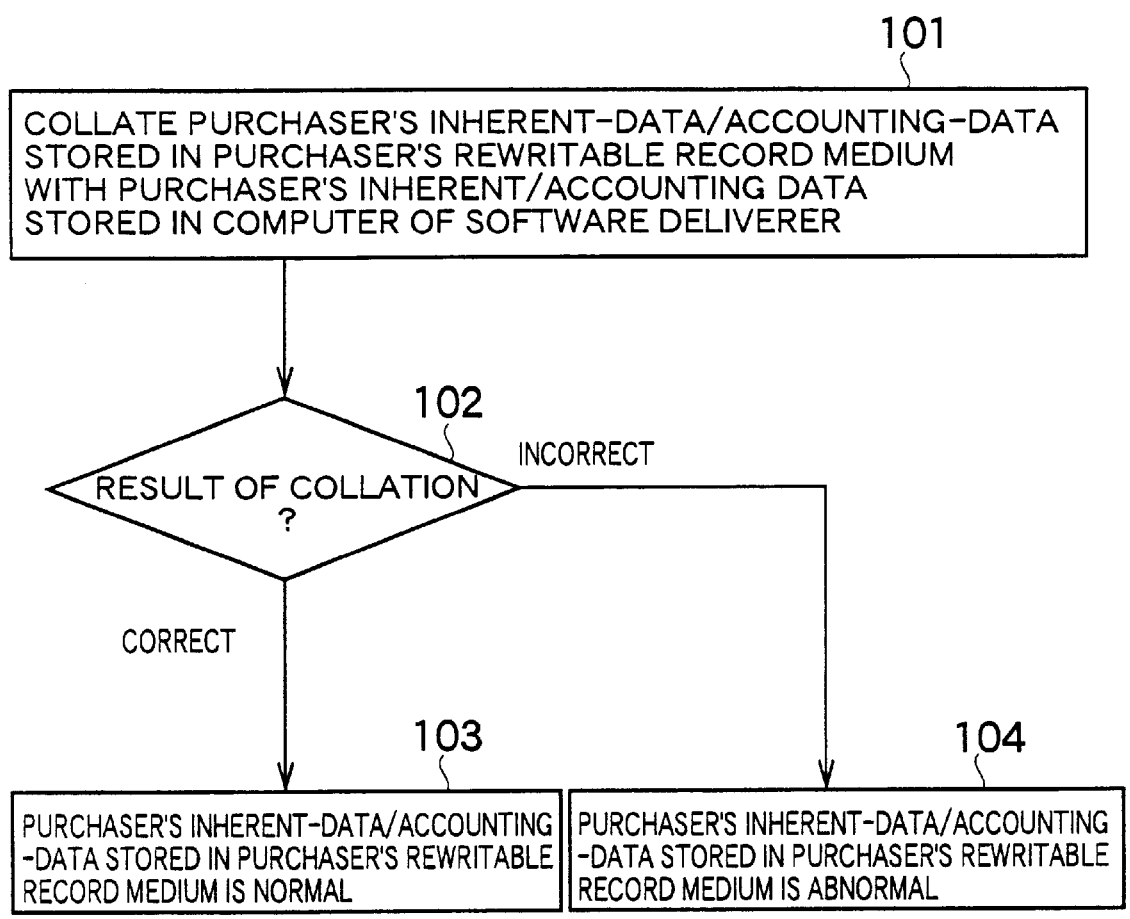

DATA DELIVERY METHOD AND SYSTEM THEREFOR

BACKGROUND OF THE INVENTION

1. Field of the Invention

The invention generally relates to a data delivery method and a system therefor and, more particularly, to a method for performing data delivery and accounting simultaneously by utilizing rewritable record medium, and a system therefor.

2. Description of the Related Art

Typical cards used instead of cash are a prepaid card, credit card and IC card.

A prepaid card is a kind of a book of coupons or tickets, on which necessary information is written by using magnetism instead of using ink, and can be utilized for paying money, the cumulative amount of which is not more than a limit amount recorded on a magnetic card, but becomes unavailable when the cumulative amount exceeds the recorded limit amount. For example, a pinball card, a telephone card and an IO card are of this type. Under the present circumstances, there are no means to prevent illegal use thereof.

A credit card can be used at member stores accepting the card. When using a credit card, the payment or repayment of the price for a commodity is postponed for a certain grace period. Further, the price for the commodity is automatically paid from a corresponding bank account. Authorization is, however, needed so as to prevent any illegal use of a credit card. It is common to use credit cards for the payment of charges for utilizing a system for acquiring value-added data or various control data through a wire telephone circuit, a radiotelephone circuit or satellite broadcasting.

An IC card is a card with an embedded IC having a memory portion, which serves as a storage unit, and a microprocessor portion. Thus, an IC card itself has logical processing functions such as data generation and logical decision. For instance, electronic money is of this type. An IC embedded in the card has the function of checking authenticity and of rewritably storing electronic money data transferred thereto. This rewritable storage function permits a person, who is other than a purchaser, to deposit in an IC card.

The conventional card systems, however, have encountered the following problems in the case of delivering software, such as game software, and data by using these cards:

( 1) In the Case of a Prepaid Card

① Because each purchaser's data is not linked with a management computer, magnetic information can be illegally changed. Moreover, prepaid cards are easily counterfeited. Actually, as is well known, the presence of counterfeited pinball cards has become obvious.

② Readers, such as a card reader, designed specifically for reading prepaid cards are necessary. Thus, the miniaturization, power-saving and reduction in price of prepaid cards cannot be realized.

③ Because data cannot be reloaded into a prepaid card, the prepaid card cannot be used again after cash represented by cash data or a call rate represented by call-rate data is used up.

④ When purchasing software by a machine for selling software, which is installed in the form of a vending machine, or when purchasing a communication playing game and software, of the communication utilizing type for acquiring image information and music information by using communication, there is the necessity for purchasing a prepaid card in addition to such software. This is very inconvenient for a purchaser.

( 2) Credit Card

① Purchasers are limited to possessors of credit cards. This is a hindrance to an increase in the number of purchasers.

② It is troublesome to contract with a credit card company to possess a credit card. This is an obstacle to an increase in the number of purchasers.

③ Credit card do not have a function of communicating with a computer of a software deliverer about sales conditions of software. Thus, sales management cannot be performed.

( 3) IC Card

An IC Card has logical processing functions such as data generation and logical decision. Thus, IC cards do not have the defects of a prepaid card and a credit card, but have encountered the following problems.

① Data to be stored in an IC card includes various and many data, such as personal data, which should be concealed. To ensure security, advanced encryption techniques and sophisticated anti-copying techniques are required.

② very large-scale IC-card system is needed. Moreover, the structure of an IC card is complex.

③ Memory capacity of IC card is low. It is, thus, difficult to store a large size program, such as game software, in an IC card.

④ IC card system are still in an experimental stage. It is, therefore, difficult to easily realize IC cards at low cost.

Especially, in the game industry, systems for software delivery through a network have been already put into service. However, in the case of the conventional card systems, software cannot be delivered easily and safely from deliverers by using cash data.

The invention eliminates the problems of the conventional data delivery techniques for delivering software from a software deliverer at the request of a purchaser.

SUMMARY OF THE INVENTION

Accordingly, an object of the invention is to provide a data delivery method by which data is delivered easily and safely by using a rewritable record medium.

Further, another object of the invention is to provide a system for performing such a method. To achieve the foregoing objects, in accordance with an aspect of the invention, there is provided a data delivery method (hereunder sometimes referred to as a first data delivery method of the present invention) which comprises: setting a purchaser's rewritable record medium in such a manner as to be able to record primary data, which includes software, and additional data, which includes purchaser's inherent data, purchase data and accounting data therein; recording historical data representing history of the additional data in both a computer of a software deliverer and the purchaser's rewritable record medium, respectively; and delivering the primary data, which is requested by a purchaser, from the computer of the software deliverer to the purchaser's rewritable record medium in a case that the historical data recorded in the computer of the software deliverer is matched with the historical data recorded in the purchaser's rewritable record medium and that an accounting operation can be performed.

Further, in accordance with another aspect of the invention, there is provided another data delivery method of delivering primary data including software, which is requested by a purchaser, from a software deliverer to the purchaser through a communication network, which comprises: preparing a purchaser's rewritable record medium adapted so that additional data, which includes three kinds of data that are purchaser's inherent data, purchase history data representing history of purchase of the primary data to be purchased by the purchaser, and accounting data, and the primary data are recorded therein; reading additional data, which is recorded in the purchaser's record medium, by a computer of the purchaser; and transmitting the read additional data to the computer, on which data management is performed in such a manner as to prevent the purchaser from writing data thereto, of the software deliverer; retrieving data, which corresponds to the transmitted additional data, from original data recorded in the computer of the software deliverer; collating the retrieved corresponding data with the additional data; stopping performance of a delivering operation of delivering the primary data if not matched, whereas if matched, an accounting operation is performed on primary data which the purchaser requests, and only if a result of the accounting operation indicates that the accounting data recorded in the purchaser's record medium is not negative, the primary data requested by the purchaser, and the additional data, which relates or corresponds to the requested primary data and includes two kinds of data that are purchase history data to be added owing to the purchase of the requested primary data and accounting data resulting from the accounting operation, are delivered from the software deliverer to the computer of the purchaser; performing additional recording of the delivered primary data, which is requested by the purchaser, and additional data relating to the delivered primary data; and performing additional recording of data, which is the same as the delivered primary data and the additional data relating to the delivered primary data, to the computer of the software deliverer.

Causes of the fabrication or forging of a prepaid card reside in that accounting data (representing an available balance (rate)) recorded on a prepaid card is not managed at all and that when the accounting data (namely, an available balance) reaches zero, the prepaid card is merely recognized as being spent. The invention provides a technique of finding a forged rewritable record medium at the time of using a prepaid card by managing the additional data, instead of preventing the fabrication of a prepaid card, as a technique for solving this problem.

In the case of the first and second data delivery methods of the invention, when authorized or legal additional data is recorded in a purchaser's rewritable record medium, the same additional data is simultaneously recorded in the computer of the software deliverer. Thus, in the case that unauthorized or illegal data is recorded in the purchaser's record medium, separately from the computer of the software deliverer, or in the case that a purchaser record medium is counterfeited, such an unauthorized or illegal past data recorded in a (counterfeited) purchaser's record medium is not matched with the past data recorded in the computer of the software deliverer, because the unauthorized or illegal data or the same additional data recorded in the purchaser's record medium is not recorded in the computer of the software deliverer. Consequently, an unauthorized use of a forged purchaser's record medium or a purchaser' record medium, in which data is tampered, can be effectively prevented by collating additional data.

Further, additional data relating to software to be written to a purchaser's record medium is recorded and accumulated in the computer of the software deliverer, simultaneously with the purchase of software. Thus, the management of sales of software can be achieved. Moreover, in the case of the first and second data delivery methods of the invention, both of software, such as a game program, and additional data, which includes accounting data, are recorded in a single purchaser's record medium. Hence, there is no necessity for separately purchasing a record medium for software and a prepaid card for purchasing the software, differently from the case of employing the conventional method. It is sufficient to purchase only a single purchaser's record medium.

Further, if record media which anyone can purchase are adopted as the purchaser's record media, there is no need for making a contract or signing up as in the case of a credit card. Thus, anyone can obtain data delivery service only by purchasing a purchaser record medium through a proper channel. Consequently, an increase in the number of purchasers can be attained.

The purchase's record medium may be constituted by a magneto-optical disk or a removable hard disk. If the purchaser's record medium is constituted by a magneto-optical disk or a removable disk, primary data and additional data can be written and read by a magneto-optical disk drive or a removable disk drive, which is incorporated in or is mounted outside an already-existing personal computer. Thus, a device, such as a card reader, designed specifically reading software and data from a card is unnecessary. Consequently, a data delivery system can be configured at low cost.

Moreover, in accordance with still another aspect of the invention, there is provided still another data delivery method (hereunder sometimes referred to as a third data delivery method of the invention), by which the purchaser deals indirectly with the software deliverer through a shop, differently from the second data delivery method of the invention, by which the purchaser deals directly with the software deliverer.

First to third data delivery methods of the invention have the following advantages ( 1) to ( 4):

( 1) Additional data in the purchaser's record medium is also recorded in the computer, which cannot be directly accessed from the purchaser, of the software deliverer. Thus, even when the purchaser's record medium is fabricated or is unauthorizedly rewritten because this record medium is rewritable, unauthorized use thereof can be effectively prevented by collating the additional data recorded in the purchaser's record medium with the additional data recorded in the computer of the software deliverer. As a consequence, software can be delivered easily and safely.

( 2) Purchaser can join only by purchasing the purchaser record medium. Thus, there is no need for making a contract or signing up, differently from the case of using a credit card. Consequently, an increase in the number of purchasers can be achieved.

( 3) Single purchaser record medium is adapted so that software and additional data including purchaser inherent data and accounting data can be recorded therein. Thus, the single purchaser record medium serves as both of a "container" for containing software and a bankbook (or passbook). Consequently, software can be purchased only by purchasing a single purchaser record medium. The procedure, through which a purchaser goes, can be simplified.

( 4) As a result of recording the additional data, which is recorded in the purchaser record medium, in the computer of the software deliverer, a software deliverer can manage the additional data recorded in the purchaser record medium. If the additional data is established in such a manner as to include software and purchaser inherent data and accounting data, the management of sales of software to be delivered can be easily achieved.

In the case of an embodiment (hereunder referred to as a fourth data delivery method of the invention) of the third data delivery method of the invention, when the purchaser meets the service offering conditions of the software deliverer, the software deliverer pays a predetermined amount of money by inputting data representing the predetermined amount of money to the purchaser's record medium so as to offer services from the software deliverer. Moreover, the payment of the predetermined amount of money is recorded in the computer of the software deliverer.

When a purchaser purchases a commodity such as software by using a prepaid card, a balance recorded in the prepaid card is merely decreased because the purchaser performs only the purchase of the commodity. However, in the case of the method of the invention using a rewritable purchaser record medium, the purchaser record medium can be freely accessed from the computer of the software deliverer. Thus, accounting data representing the balance can be increased by inputting data representing an amount of money which is commensurate with the services. Namely, in the case of the fourth data delivery method of the invention, the purchaser record medium is rewritable. Thus, what a system performs at the time of executing software is not confined to degrading the worth of the purchaser record medium and abridging the purchaser's right thereto. Software deliverer can provide services to the purchaser by paying money to the purchaser, namely, by increasing the balance that is represented by the accounting data recorded in the purchaser record medium.

In the case of another embodiment (hereunder referred to as a fifth data delivery method of the invention) of the third data delivery method of the invention, data management is performed by the aforesaid computer of the software deliverer by using an authentication function in such a manner that the purchaser cannot write data thereinto.

Thus, in the case of the fifth data delivery method of the invention, unauthorized or illegal writing of data by a purchaser to the computer of the software deliverer is prevented by fulfilling the authentication function which is a simple action or activity.

In the case of still another embodiment (hereunder referred to as a sixth data delivery method of the invention) of the third data delivery method of the invention, the purchaser inherent data includes data representing the age of the purchaser. In the case that an age limit is imposed to primary data to be purchased, a limiting age is collated with the age of the purchaser when collating the retrieved corresponding data with the aforementioned additional data. If the age of the purchaser is outside a permissible range in the case of the imposed age limit, the delivery of the aforesaid primary data is stopped.

Thus, as a result of imposing of the age limit to purchasers, harmful primary data can be effectively prevented from being passed to purchasers whose ages are less than a limiting age.

In the case of still another embodiment (hereunder referred to as a seventh data delivery method of the invention) of the third data delivery method of the invention, the purchase history data includes data representing a title of the software, a price of the aforementioned software, a name of a shop at which a purchaser has bought the software (namely, a name of a shop that has sold the software), a date and time at which the software is purchased, and the number of a write machine.

In the case of yet another embodiment (hereunder referred to as an eighth data delivery method of the invention) of the third data delivery method of the invention, the purchaser's inherent data includes data representing an identification (ID) number, a password, a date of a purchaser's birth, and a distinction of sex.

In the case of a further embodiment (hereunder referred to as a ninth data delivery method of the invention) of the third data delivery method of the invention, the accounting data includes data representing a date of accounting, an amount of deposited money, an amount of paid money, a balance, and a name of a shop that has accounted.

Thus, in the case of the seventh to ninth data delivery methods, necessary and sufficient data are recorded as the additional data. Consequently, software can be delivered more safely.

In accordance with another aspect of the invention, there is provided a data delivery system (hereunder sometimes referred to as a first data delivery system of the invention) which comprises: a computer of a software deliverer for delivering primary data such as software; a computer of a shop receiving the primary data delivered from the computer of the software deliverer through a communication network; a purchaser record medium that is owned by a purchaser and has a primary data area for recording primary data purchased by a purchaser therein, and an additional data area for recording additional data including three kinds of data, namely, purchaser's inherent data, purchase history data, which represents history of purchase of the primary data, and accounting data therein, and is adapted to be able to rewrite the primary data and the additional data, which are recorded in the primary data area and the additional data area, respectively; software-deliverer-side recording means for recording data, which is identical to the additional data to be recorded in the purchaser record medium as original data therein; regulating means for imposing restriction on the rewriting of original data, which is recorded in the software-deliverer-side recording means by the purchaser; collating means for retrieving original data, which corresponds to the additional data recorded in the purchaser record medium, from the software-deliverer-side recording means, for collating the original data, which is recorded in the software-deliverer-side recording means, with the additional data which is recorded in the purchaser record medium and is sent from the computer of the shop to the of the software deliverer through the network, for continuing an operation of delivering the primary data if matched, and for stopping the operation of delivering the primary data if not matched; and control means for performing an accounting operation, which relates to the primary data to be purchased by the purchaser, when continuing the operation of delivering the primary data according to a result of collation performed by the collating means, for recording the primary data, which is delivered from the computer of the software deliverer to the computer of the shop through the network, in the primary data area of the aforesaid purchaser, and for recording the additional data, which includes two kinds of data, namely, purchase history data and accounting data to be related to the primary data purchased by the purchaser and to be added when purchasing the primary data, in the additional data area of the purchaser record medium and in the software-deliverer-side recording means. The software-deliverer-side-recording means, regulating means, collating means and control means are provided in the computer of the software deliverer.

Because of the restriction imposed on the rewriting of the additional data recorded in the software-deliverer-side recording means of the first data delivery system of the invention, the purchaser cannot change the additional data recorded in the software-deliverer-side recording means even when the purchaser can unauthorizedly or illegally change the additional data recorded in the purchaser record medium. Therefore, although the purchaser record medium is rewritable, the purchaser record medium cannot be used unauthorizedly or illegally by being rewritten. With the simple configuration by which the same data as the additional data recorded in the additional data area of the purchaser record medium is simply recorded in the software-deliverer-side recording means, unauthorized or illegal use of a purchaser record medium due to fabrication or falsification can be prevented even when using a rewritable purchaser record medium. Namely, a highly reliable data delivery system can be constructed by employing a simple structure by which an additional data area is added to the purchaser record medium for recording software to be purchased by a purchaser therein, and additional data, such as the purchaser inherent data, the accounting data and data relating to software, are recorded in the additional data area and are simultaneously recorded in the software-deliverer-side recording medium and then managing both of the additional data.

In accordance with still another aspect of the invention, there is provided a rewritable purchaser record medium (hereunder sometimes referred to as a first record medium of the invention) which comprises: a primary data area, in which primary data such as software requested by a purchaser is recorded; and an additional data area in which additional data that relates to the primary data and includes three kinds of data, namely, purchaser's inherent data, purchase data history and accounting data.

Thus, in the case of employing the first record medium of the invention, such a single record medium can have a program storing function and a bankbook (or passbook) function. Further, unauthorized or illegal use of a purchaser record medium due to fabrication or falsification can be prevented by such a simple structure of a rewritable purchaser record medium in which the primary data area and the additional data area are provided.

BRIEF DESCRIPTION OF THE DRAWINGS

Other features, objects and advantages of the invention will become apparent from the following description of a preferred embodiment with reference to the drawings in which like reference characters designate like or corresponding parts throughout several views, and in which:

FIG. 3 is a diagram illustrating the data format used in a purchase history data region of the embodiment of the invention and examples of such data used therein;

FIG. 4 is a diagram illustrating the data format used in a purchase inherent data region and an accounting data region of the embodiment of the invention and examples of such data used therein; and FIG. 5 is a flowchart illustrating a process of finding a fabrication of a purchaser record medium.

DETAILED DESCRIPTION OF THE PREFERRED EMBODIMENT

Hereinafter, an embodiment of the invention, namely, data delivery method and system of the invention applied to the sales of game software to be delivered by a software deliverer through a communication network will be described in detail by accompanying drawings.

Figure 1:
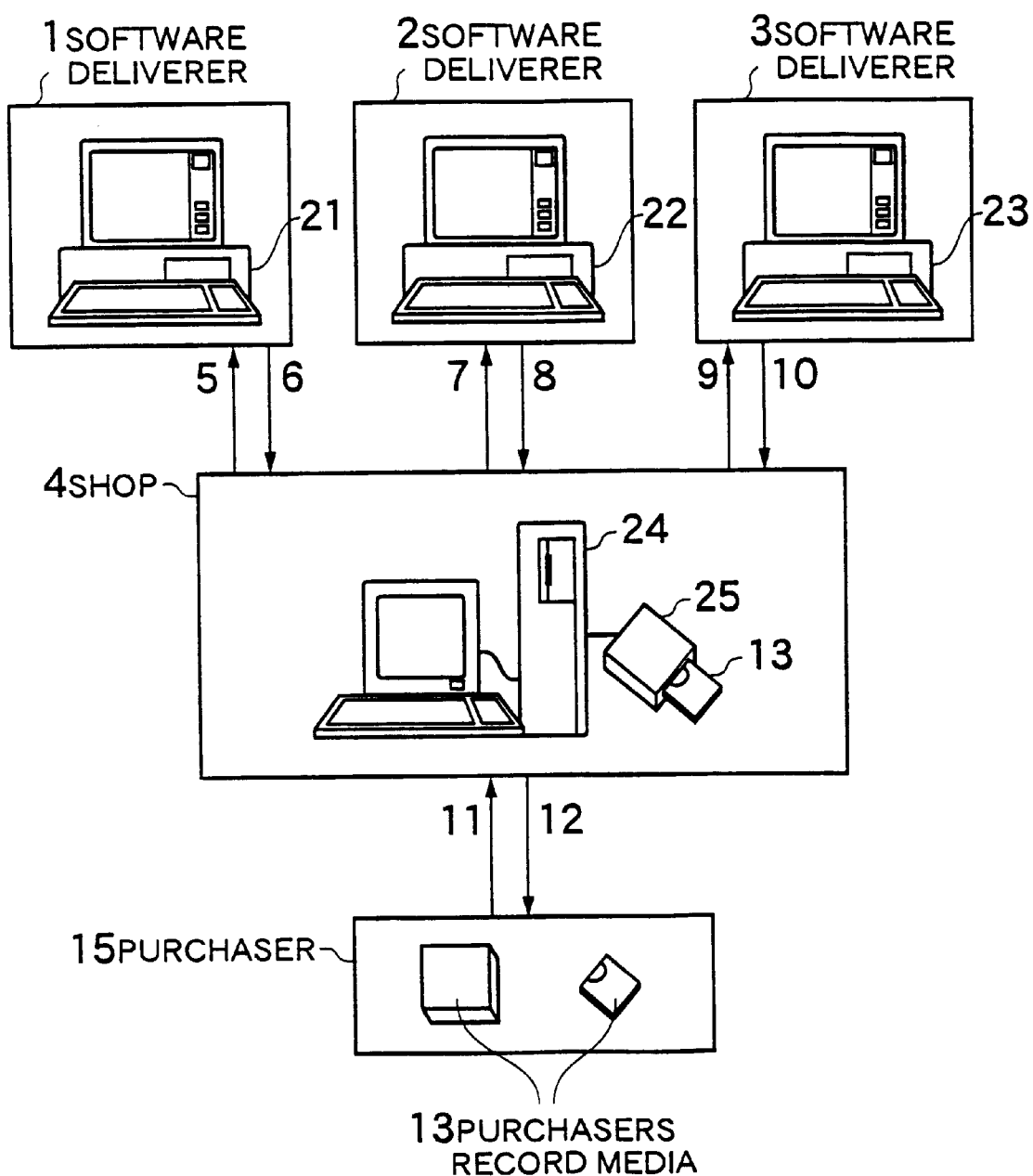
FIG. 1 is a block diagram illustrating the configuration of a system which is an embodiment of the invention.

In the case of this system, when delivering game software from the software deliverer to a purchaser who comes to the shop, not only the game software but data relating to the contents of the purchased software and accounting data are recorded in a removable purchaser record medium set in the computer of the shop. Moreover, the data relating to the contents of the purchased software and the accounting data are also recorded in the computer of the software deliverer. Thus, unauthorized or illegal use of the card is prevented by collating the data recorded in the purchaser's recording medium with the past data recorded in the computer of the software deliverer. System Configuration FIG. 1 is a block diagram illustrating the configuration of software sales system. Software deliverers 1, 2 and 3 deliver original primary data relating games, namely, original software such as programs, image data, voice data, and value-added data for controlling and expanding operations and functions of machines. Further, the software deliverers 1, 2 and 3 deliver original primary data from the computers 21, 22 and 23 thereof to the computer 24 of a shop 4 through downstream communication networks 6, 8 and 10, for instance, wire communication networks, such as a general public telecommunication line, an integrated services digital network (ISDN) and a cable television (CATV) network, and radio communication networks utilizing optical communications, acoustic or sound waves and satellite communications. Incidentally, the reason why the words "deliverer" and "deliver" are used herein is that the primary data is actually distributed to many shops 4, though only one shop 4 is shown in this figure for convenience in drawing. Software deliverers manage data recorded in the computers 21, 22 and 23 thereof by using the authentication functions individually. Namely, the authentication function is performed by using an identification number (ID) and a password that are allocated to each of the software deliverers. Thus, even when a purchaser tries to access directly to the computer of the software deliverer, it is substantially impossible to tamper and download the data recorded therein. Practically, data bases, which are unique to the software deliverers but are not open to the public, are constructed in the computers 21 to 23, respectively. These data bases are associated with the write machine numbers assigned to a write machine of the computers 24 of the shops 4. Consequently, shops and persons other than the registered shops 4 cannot access such data bases.

In the case of this embodiment, it is assumed that the computer 24 of the shop 4 has the communication function of communicating with the computers 21 to 23 of the software deliverers 1 to 3. Further, the computer 24 of the shop 4 is installed at a place which is convenient for purchasers to come, for example, in the inside or at the counter of a shop, such as a convenience store, or of a shop suited to the contents of software for sale.

Purchaser 15 first purchases a rewritable purchaser record medium 13 at the shop 4. Alternatively, the purchaser 15 brings a general-purpose record medium, which he has already purchased, to the shop4 (see reference numeral 11). Then, the purchaser 15 communicates with the computer 21, 22 or 23 of the designated one of the software deliverers 1 to 3 by using the computer 24 of the shop 4. Namely, data communication between the shop computer 24 and one of the computers 21 to 23 of the software deliverers is conducted. If the balance stored in the purchaser record medium 13 is not negative even after subtracting the price for desired game software therefrom, the desired game software, which is delivered from the software deliverer 1,2 or 3 to the computer 24 of the shop 4, is written to the purchaser record medium 13, and then the purchaser takes this purchaser record medium 13 to his home (see reference numeral 12). Purchaser loads the purchaser record medium 13 into the main unit of a game machine and thus can play and enjoy the game. When the purchaser is satiated with this game, he can rewrite game software by replacing it with other game software many times within the balance, namely, an amount of money presently indicated by the additional data recorded in the purchaser record medium 13. Further, the purchaser may add game software to the purchaser record medium, namely, increase the number of game software recorded therein within storage or memory capacity thereof. In the case of this embodiment, a removable hard disk, which is one of the most popular record media, is employed as the purchaser record medium As a result of using a removable hard disk, already-existing personal computer can be used. Consequently, the system can be constructed at low cost.

Figure 2:
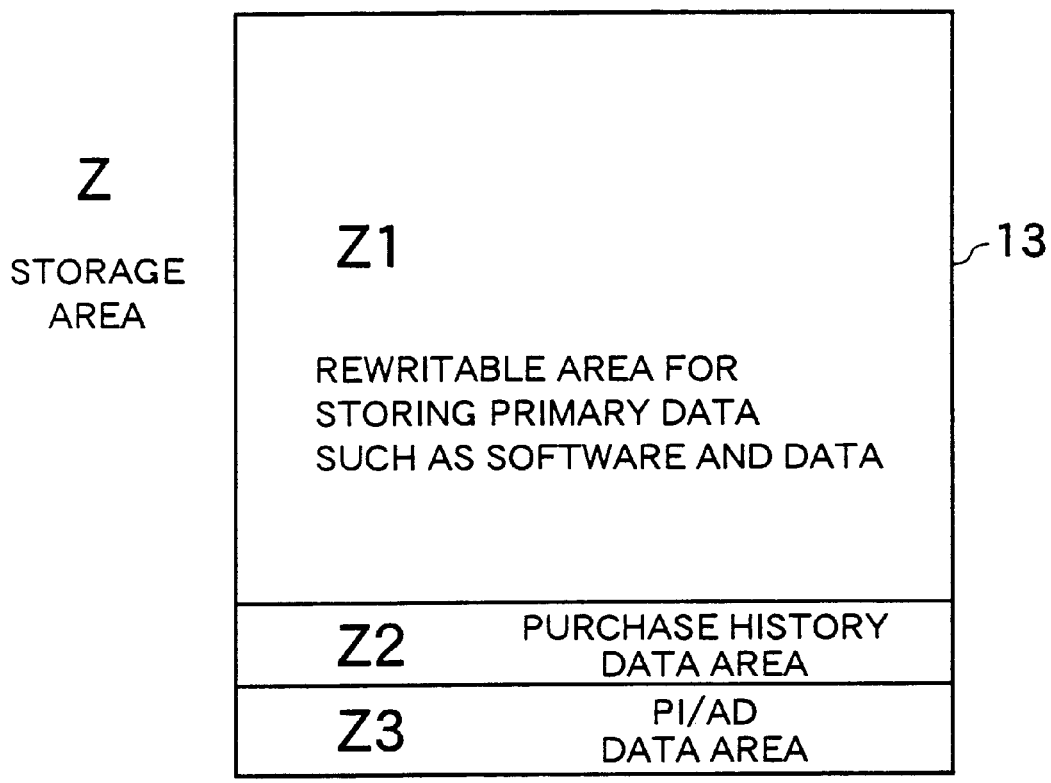
FIG.2 is a diagram illustrating the allocation of storage areas of a purchaser record medium of the embodiment of the invention.

As illustrated in FIG. 2, a storage area 2 of the purchaser record medium 13 is composed of: a rewritable area Z1 for storing primary data such as software and data in such a manner as to be able to rewrite or replace currently recorded software and data; a purchase history data area Z2; and a purchaser's inherent-data/accounting-data area Z3. Primary data area is constituted by the rewritable area Z1, while the additional data area is constituted by the purchase history data area Z2 and the purchaser's inherent-data/accounting-data area Z3. Software such as game software for playing interactive communication games of chess, "go" or "shogi" by using game machines or personal computers, and/or data such as image data and music data are written to the rewritable area Z1. Other information is written to the purchase history data area Z2 and the purchaser's inherent-data/accounting-data area Z3. Incidentally, the purchase history data area corresponds to a merchandise management ledger. Further, the purchaser's inherent-data/accounting-data area Z3 corresponds to a passbook or bankbook.

When the purchaser sets the purchaser record medium 13 in the write machine 25 of the computer 24 of the shop 4 so as to purchase software, the computer 24 of the shop 4 writes game software, which is delivered from the software deliverer 1, 2 or 3, to the rewritable area Z1, and also writes additional data to the purchase history data area Z2 and the purchaser's inherent-data/accounting-data area Z3. Simultaneously with the writing of the data to the purchaser record medium 13, the computer 24 of the shop 4 sends the same data as the purchase history data and the purchaser's inherent-data/accounting-data, which are written to the purchaser record medium 13, to the computers 21 to 23 of the software deliverers 1 to 3 through the communication networks 5, 7 and 9, and records the same data as the purchase history data and the purchaser's inherent-data/accounting-data in the computers 21 to 23.

Software deliverers 1 to 3 refer to the same data as the purchaser's inherent-data/accounting-data recorded in the purchaser record medium 13, and make up accounts by subtracting the price of the delivered software from the balance indicated by the same data as the purchaser's inherent-data/accounting-data. Moreover, the software deliverers 1 to 3 refer to the purchase history data and perform other accounting operations such as addition and collation operations.

An accounting system of the communication network can be utilized when delivering value-added data to an unspecified number of purchasers through a satellite broadcasting system and the Internet. Incidentally, recording means, regulating means, collating means and means for causing the recording are constituted by the computers 21 to 23.

Purchase History Data and Purchaser's Inherent-Data/Accounting-Data Recorded in Purchaser Record Medium ( 1) Purchase History Data FIG. 3 shows an example of allotting a part of the storage area Z of the rewritable purchaser record medium 13 of the purchaser 15 to the purchase history data area Z2, and storing purchaser history data in the data area Z2.

According to a purchase history data format illustrated in this figure, 1 block of data consists of: data representing the title A1 of the purchased software; data representing the price A2 of the purchased software; data indicating the shop at which the purchaser has purchased the software; data designating the date and time A4 at the purchase of the software; and the number of the write machine of the shops computer. Each time the purchaser purchases software, one block of data ((B1 to B5), (C1 to C5), . . . ) is added to the purchaser record medium 13. Thus, purchase history data are accumulated therein without updating the past purchase history data. Incidentally, the specifications of the data format of data to be recorded in the purchase history data area may be determined according to the purposes of establishing such data. Thereby, the function of the system can be expanded.

① Examples of Purchaser History Data

In the case that a purchaser purchased software titled "Strongest Shogi 1997" at 16:25 on Apr. 10, 1997 at a Kamata branch store of a chain store "THE CONVENIENCE" at 5,800 yen, the following data were recorded as purchase history data A1 to A5. Namely, "Strongest Shogi 1997" was stored as the title of the purchased software in a region A1. Further, numeric data "5800" obtained by simplifying price data "5,800 yen" was stored as the price of the purchased software in the region A2. Moreover, character data "THE CONVENIENCE Kamata branch store" was stored as the name of the shop, at which the purchaser purchased the software, in the region A3. Furthermore, numerical data "199704101625" obtained by simplifying data "at 16:25 on Apr. 10, 1997" was stored in the region A4. Additionally, the write machine No. "00002537" corresponding to the shop, at which the purchaser purchased the software, was stored in the region A5.

② In the case that the purchaser purchased software titled "Best Golf Nagano Prefecture" at 11:38 on May 5, 1997 at a Shinjuku branch stores of "Marudai Department Store" at 4,900 yen, the following data were recorded as purchase history data B1 to B5. Namely, "Best Golf Nagano Prefecture" was stored as the title of the purchased software in a region B1. Further, numeric data "4900" obtained by simplifying price data "4,900 yen" was stored as the price of the purchased software in the region B2. Moreover, character data "Marudai Department Store Shinjuku branch store" was stored as the name of the shop, at which the purchaser purchased the software, in the region B3. Furthermore, numerical data "199705051138" obtained by simplifying data "at 11:38 on May 5, 1997" was stored in the region B4. Additionally, the write machine No. "0000027151138" corresponding to the shop, at which the purchaser purchased the software, is stored in the region B5.

③ In the case that a purchaser purchased software titled "MAH-JONG LI-ZHI IPPATSU" at 21:57 on Jun. 20, 1997 at a Shibuya branch stores of the "Yotsukoshi Department Store" at 5,500 yen, the following data were recorded as purchase history data C1 to C5. Namely, character data "MAH-JONG LI-ZHI IPPATSU" was stored as the title of the purchased software in a region C1. Further, numeric data "5500" obtained by simplifying price data "5,500 yen" was stored as the price of the purchased software in the region C2. Moreover, character data "Yotsukoshi Department Store" was stored as the name of the shop, at which the purchaser purchased the software, in the region C3. Furthermore, numerical data "199706202157" obtained by simplifying data "at 21:57 on Jun. 20, 1997" was stored in the region C4. Additionally, the write machine No. "00005963" corresponding to the shop, at which the purchaser purchased the software, was stored in the region C5.

(2) Purchaser's Inherent Data/Accounting Data

FIG. 4 shows an example of assigning a part of the storage area Z of the rewritable purchaser record medium 13 of the purchaser 15 to the purchaser's inherent data/accounting data area Z3, and storing purchaser's inherent data/accounting data in the data area Z3.

Purchaser's inherent data/accounting data includes: purchaser's inherent data; and accounting data. Purchaser's inherent data includes: data representing ID number D1; data representing a password D2; data representing the date of the purchaser's birth D3; and data designating the distinction of sex of the Purchaser D4. On the other hand, the accounting data includes: data representing the date and time of accounting E1; data representing an amount of deposited money E2; data representing an amount of paid money E3; data indicating a balance E4; and data designating a shop having accounted E5. According to a purchase's inherent data/accounting data area format illustrated in this figure, 1 block of the accounting data consists of the data E1 to E5. Each time when the purchaser purchases software, one block of the accounting data ((F1 to F5), (G1 to G5), (H1 to H5), . . . ) is added to the purchaser record medium 13. Thus, the accounting data are accumulated therein without updating the past purchase history data. Incidentally, the specifications of the data format of data to be recorded in the purchaser's inherent-data/accounting-data area may be determined according to the purposes of establishing such data. Consequently the function of the system can be expanded.

① Examples of Purchaser's Inherent Data/Accounting Data

In a region D1, data "ST 781249" is registered as the ID NO. assigned to the purchaser. Further, numerical data representing a password "7298" determined by the purchaser of his own will as the password in a region D2. Moreover, data "1959.02.23" indicating the corresponding date of the purchaser's birth in the Christian Era (in the case that the date of his birth is February 23 of thirty-fourth year of Showa) is stored in a region D3. Furthermore, if the purchaser is male, a value of "0" is stored, and in contrast, if the purchaser is female, a value of "1" is stored as data registered for distinction of sex of the purchaser in a region D4.

② In the case that the purchaser deposited 20,000 yen into the purchaser record medium (namely, purchased balance data representing 20,000 yen) at 16:20 on Apr. 10, 1997 at a Kamata branch stores of a chain store "THE CONVENIENCE", the following data were recorded as the accounting data E1 to E5. Namely, numerical data "199704101620" obtained by simplifying data "at 16:20 on Apr. 10, 1997" was stored in the region E1 as indicating "the date of accounting". Further, numeric data "20000" obtained by simplifying deposited amount data "20,000 yen" was stored in the region E2 as indicating the "amount of deposited money". Moreover, a value of "0" was stored in the region E3 as representing the "amount of paid money".

Furthermore, numerical data "20000" obtained by simplifying balance data "20,000 yen" was stored in the region E4 as representing a current balance.

③ In the case that the purchaser purchased software at 16:25 on Apr. 10, 1997 at a Kamata branch stores of a chain store "THE CONVENIENCE" at 5,800 yen, the following data were recorded as the accounting data F1 to F5. Namely, numerical data "199704101625" obtained by simplifying data "at 16:25 on Apr. 10, 1997" was stored in the region F1 as indicating "the date of accounting". Further, a value of "0" was stored in the region F2 as indicating the "amount of deposited money". Moreover, numerical data "5800" obtained by simplifying the price of the purchased software "5,800 yen" was stored in the region F3 as representing the "amount of paid money". Furthermore, numerical data "14200" obtained by simplifying balance data "14,200 yen" (E4+F2−F3=14,200) was stored in the region F4 as representing a current balance ④ In the case that the purchaser purchased software at 11:38 on May 5, 1997 at a Shinjuku branch stores of "Marudai Department Store" at 4,900 yen, the following data were recorded as purchase history data G1 to G5. Namely, numerical data "1997051138" obtained by simplifying data "at 11:38 on May 5, 1997" was stored in the region G1 as indicating "the date of accounting". Further, a value of "0" was stored in the region G2 as indicating the "amount of deposited money". Moreover, numerical data "4900" obtained by simplifying the price of the purchased software "4,900 yen" was stored in the region G3 as representing the "amount of paid money". Furthermore, numerical data "9300" obtained by simplifying balance data "9,300 yen" (F4+G2−G3=9,300) was stored in the region G4 as representing a current balance ⑤ In the case that the purchaser purchased software at 21:57 on Jun. 20, 1997 at a Shibuya branch stores of the "Yotsukoshi Department Store" at 5,500 yen, the following data were stored as the accounting data H1 to H5. Namely, numerical data "199706202157" obtained by simplifying data "at 21:57 on Jun. 20, 1997" was stored in the region H1 as indicating "the date of accounting". Further, a value of "0" was stored in the region H2 as indicating the "amount of deposited money". Moreover, numerical data "5500" obtained by simplifying the price of the purchased software "5,500 yen" was stored in the region H3 as representing the "amount of paid money". Furthermore, numerical data "3800" obtained by simplifying balance data "3,800 yen" (G4+H2−H3=3,800) was stored in the region H4 as representing the current balance.

Flow of Data

Software is delivered by utilizing the communication networks 5 to 10 established between the computer 24 of the shop and a group of the computers 21 to 23 installed in the offices of the deliverers 1 to 3. Moreover, cash data is exchanged therebetween by utilizing these communication networks. Software deliverers 1 to 3 collate data sent from the purchaser record medium of the purchaser having purchased software with the past recorded data. If matched, the operation of delivering software is continued Conversely, if not matched, the software deliverer stops this operation and takes a necessary step.

(1) System for Finding Forgery

When legally writing additional data to additional data area Z2 and Z3 of the purchaser record medium 13 through the shop 4, the same data as the additional data is written to the computers 21 to 23 installed in the offices of the software deliverers 1 to 3. Therefore, the purchaser's inherent data/accounting data of the purchaser record media 13 of all of the registered purchasers are recorded in the computers 21 to 23 of the software deliverers 1 to 3. As long as there is no data unauthorizedly or illegally written to the purchaser record medium 13, certain additional data recorded in the computers 21 to 23 is matched with corresponding additional data recorded in the purchaser record medium 13. Thus, if there is forged data, no match occurs in the collation therebetween. Consequently, the presence of the forged data can be found.

Namely, as illustrated in FIG. 5, in step 101, the software deliverer retrieves the purchaser's inherent data/accounting data corresponding to ID No., which is included in the purchaser's inherent data/accounting data recorded in the purchaser record medium 13, from the purchaser's inherent data/accounting data stored in the corresponding one of the computers 21 to 23. Then, the software deliverer collates the purchaser's inherent data/accounting data, which is recorded in the purchaser record medium 13, with the retrieved purchaser's inherent data/accounting data stored in the corresponding one of the computers 21 to 23. At that time, if the collation of the accounting data therebetween is performed in addition to the aforementioned collation of the purchaser's inherent data, high-level security is obtained. As a result of the collation in step 102, if matched, the process advances to step 103 whereupon it is judged that the purchaser's inherent data/accounting data recorded in the purchaser record medium 13 is normal. Thereafter, the computer of the software deliverer proceeds to the delivery operation which includes the accounting process. In contrast, if not matched, the process advances to step 104 whereupon it is judged that the purchaser's inherent data/accounting data recorded in the purchaser record medium 13 is abnormal. Then, the computer of the software deliverer stops the delivery operation. If necessary, the purchaser record medium 13 is forcibly ejected from the computer 24 of the shop 4. Moreover, the deliverers 1 to 3 sometimes specify a purchaser who has used the purchaser record medium 13 illegally or unauthorizedly, and take a necessary step.

(2) Flow of Data after Collation

If it is judged that the purchaser's inherent data/accounting data recorded in the purchaser record medium is normal, the software deliverers 1 to 3 deliver software, which is desired by the purchaser, to the shop by utilizing the communication network. At that time, the software deliverer refers to the date of the purchaser's birth (D3) in the purchaser's inherent data/accounting data (FIG. 4). Furthermore, if the age limit is imposed to the game software to be delivered, and the purchaser is not allowed to use this game software in view of the age limit, the software deliverers restrict and stop the delivery of this game software. Additionally, if necessary, the software deliverers may cause the computer 24 to output a message indicating such a fact.

Subsequently, the delivered game software is recorded in the rewritable area Z1 of the purchaser record medium 13 by the computer 24 of the shop 4. In addition, the necessary data is recorded in the purchase history data area Z2 and the purchaser's inherent-data/accounting-data area Z3 of the purchaser record medium 13. At that time, the same data is recorded in the purchase history data area Z2 and the purchaser's inherent-data/accounting-data area Z3 of the computers 21 to 23 of the software deliverers 1 to 3 through the communication networks 5, 7 and 9

As above described, in the case of this embodiment, the same data as the additional data recorded in the purchaser record medium is stored in the computers of the software deliverers. Thus, the forged or tampered purchaser record medium or the double use of data can be checked by collating the additional data recorded in the record medium of the purchaser with the additional data stored in the computer of the software deliverer. Therefore, even if the record medium is a rewritable medium, the system is not affected by forged record media, and the reliability of the system can be enhanced.

Meanwhile, the shop does not need a machine, such as a card reader, designed for specifically reading cards. Further, the shop can utilize the already-existing personal computer equipped with a magneto-optical disk drive unit. Thus, the system can be constructed at low cost. Especially, the storage capacity of a magneto-optical disk is large. Thus, even game software, whose program size is very large, can be recorded in a magneto-optical disk substantially without restrictions, differently from the case of utilizing IC card. Furthermore, the rewriting of game software can be performed many times as long as permitted in view of the amount of the balance recorded in the purchaser record medium. Furthermore, when purchasing magneto-optical disks, there is no need for performing a time-consuming process of making a contract, differently from the case of using a credit card. Consequently, an increase in the number of purchasers can be achieved. Moreover, in the case this embodiment, both of software and additional data are written to a single magneto-optical disk. Namely, game software and a card for purchasing the game software are purchased at the same time. Therefore, as compared with the conventional case of purchasing game software and such a card separately, the purchase record medium of the invention is very convenient for purchasers.

In the case of the system of the invention, the additional data, such as the purchase history data recorded in the purchaser record medium, is recorded in the computers of the software deliverers. Thus, the sales management of software can be performed, differently from the conventional case of using credit cards. Moreover, the sales conditions of software can be grasped in real time. Therefore, the cost of this system of the invention is lower than the case of introducing POS terminals. In addition, the system, whose performance is equivalent to that of POS, can be constructed. Further, the purchaser record medium is rewritable, differently from prepaid cards. Moreover, an additional data area, in which additional data is rewritten, is provided in the purchaser record medium. This enables the purchaser record medium of the invention to perform an addition of additional data, though only a subtraction of additional data is possible in the case of a conventional ordinary system using a medium such as a prepaid card. For example, the software deliverers can add additional data to the presently existing additional data in the purchaser record medium as a token of appreciation for the purchaser's response to questionnaires from the software deliverers, as a giveaway offered by lot, or as property or a right to use, which is transferred from another person. Consequently, a party providing information, such as software deliverers, can add a right to utilize their service to that of a purchaser of the information.

Furthermore, a same purchaser record medium can be used many times by writing new cash data thereto even when money represented by cash data recorded in the record medium is spent out. Consequently, effective utilization of resources can be achieved.

Further, in the case of the system of the invention, data written to the purchaser record medium as the additional data is utilized. Thus, differently from the software deliverer who uses the conventional system and charges only owners of credit cards, the software deliverer using the system of the invention can charge persons other than the owners of credit cards and thus can increase the number of users or purchasers in addition to the owners of credit cards. Therefore, the invention provides a new accounting system for use in transactions by utilizing communications, by which additional data is referred to safely and easily, differently from the conventional system of using a credit card and a prepaid card. Especially, in the case of the system of the invention, the additional data is added to the purchaser record medium by a block each time, and the past payment history is preserved, and, namely, the additional data is not updated. Consequently, even if the data is tampered, such tampered data can be easily detected by collating the additional data with the past record. Incidentally, the embodiment of the invention is adapted so that the collation of only the purchaser's inherent data/ accounting data is performed. However, the collation of the entire additional data may be performed. Further, the collation is performed by the computer of the software deliverer to thereby prevent an occurrence of an unauthorized or illegal act in the shop. However, if there is no fear that an unauthorized or illegal act occurs in the shop, the computer of the shop may have such a collating function, for example, in the following manner. Namely, the purchaser's inherent data/accounting data recorded in the purchaser record media 13 of all of the registered purchasers are recorded in the computer 24 of the shop 4. Then, the purchaser's inherent data/accounting data corresponding to ID No., which is included in the purchaser's inherent data/accounting data recorded in the purchaser record medium 13, is retrieved from the purchaser's inherent data/accounting data stored in the computer 24. Then, the purchaser's inherent data/accounting data, which is recorded in the purchaser record medium 13, is collated with the retrieved purchaser's inherent data/accounting data stored in the computer 24.

Moreover, in the case of this embodiment of the invention, the utilization of the communication networks is introduced to the system by assuming the application of the invention to a very large scale system. However, the invention can be applied to a small scale system which does not use communication networks.

Incidentally, a floppy disk, a magnetic disk, a magneto-optical disk (MO), an optical disk (including what is called "PD" (Phase-change-type optical Disk) manufactured by Matsushita Electric Industrial Co., Ltd.), a removable hard disk (including "Jaz drive" developed by Iomega Corporation), a high-capacity floppy disk (including "ZIP drive" deveoped by Iomega Corporation) DVD (Digital Video Disk), and high-capacity IC memory card (which will be available in future) may be employed as rewritable purchaser record media. Furthermore, systems and networks, which are different in criteria for charging users (for instance, the usage-sensitive rates depending upon the contents of software to be purchased and the quantity, quality or contents of value-added data can be managed comprehensively, simply and safely by a single system. Additionally, to ensure highlevel security, additional data may be encrypted.

Moreover, the recording area of the purchase recording medium is partitioned into the purchase history data area and the purchaser's inherent- data/accounting-data area. Furthermore, a part of the data is duplicatively stored therein. However, in place of these two data areas, a single data adding area may be established in the record medium so as to prevent the data from being stored duplicatively in the record medium.

Furthermore, in the case that the quantity of data delivered from the software deliverers 1 to 3 to the shop 4 is very large, software or data may be directly delivered to the shop 4 by utilizing recording media such as CD-ROM (Compact Disk Read-Only Memory), and then the software or data may be written to the computer of the shop by regarding the shop as a software deliverer. Additionally, the software deliverer trades in software indirectly with the purchaser through the shop. However, the software deliverer may trade in software directly with the purchaser by utilizing the Internet or personal computer communications.

Although the preferred embodiment of the invention has been described above, it should be understood that the invention is not limited thereto and that other modifications will be apparent to those skilled in the art without departing from the spirit of the invention.

The scope of the invention, therefore, is to be determined solely by the appended claims.

What is claimed is:

1. A data delivery method comprising:

providing a purchaser rewritable record medium having a primary data area for storing primary data including software, and an additional data area for storing additional data including purchaser inherent data, purchase data and accounting data therein;

recording historical data representing a history of the additional data in both of a computer of a software deliverer and said purchaser rewritable record medium, respectively; and delivering the primary data, which is requested by a purchaser, from said computer of the software deliverer to said purchaser rewritable record medium when the historical data recorded in said computer of the software deliverer is matched with the historical data recorded in said purchaser rewritable record medium; and performing an accounting operation.

2. A data delivery method of delivering primary data including software, which is requested by a purchaser, from a software deliverer to the purchaser through a communication network, comprising:

providing a purchaser rewritable record medium including a primary data area and an additional data area, the additional data including purchaser inherent data, purchase history data representing a history of purchase of said primary data to be purchased by said purchaser, and accounting data;

reading the additional data, which is recorded in said purchaser record medium, by a computer of said purchaser; and transmitting the read additional data to said computer of the software deliverer, on which data management is performed in such a manner as to prevent said purchaser from writing data thereto;

retrieving data, which corresponds to the transmitted additional data, from original data recorded in the computer of the software deliverer;

collating the retrieved corresponding data with said transmitted additional data;

stopping delivery of said primary data if the transmitted additional data and the retrieved corresponding data are not matched;

whereas if matched, performing an accounting operation on the primary data which the purchaser requests;

and only if a result of the accounting operation indicates that the accounting data recorded in said purchaser record medium is not negative, delivering the primary data requested by the purchaser and the additional data, which corresponds to the requested primary data and includes two kinds of data that are purchase history data to be added owing to the purchase of the requested primary data and accounting data resulting from said accounting operation, from the computer of the software deliverer to said computer of the purchaser;

performing additional recording of the delivered primary data, which is requested by the purchaser, and additional data relating to the delivered primary data; and performing additional recording of data, which is the same as the delivered primary data and said additional data relating to the delivered primary data, to said computer of the software deliverer.

3. A data delivery method of delivering primary data including software, which is requested by a purchaser who has visited a shop, from a software deliverer to the purchaser through a communication network, comprising:

providing a purchaser rewritable record medium including a primary data area and an additional data area, the additional data including purchaser inherent data, purchase history data representing a history of purchase of said primary data to be purchased by said purchaser, and accounting data;

reading the additional data, which is recorded in said purchaser record medium, by a computer of said shop; and transmitting the read additional data to said computer of the software deliverer;

performing data management to prevent said purchaser from writing data to the computer of the software deliverer;

retrieving data, which corresponds to the transmitted additional data, from original data recorded in the computer of the software deliverer;

collating the retrieved corresponding data with said additional data;

stopping delivery of said primary data if the transmitted additional data and the retrieved corresponding data are not matched;

whereas if matched, performing an accounting operation on the primary data which the purchaser requests;

and only if a result of the accounting operation indicates that the accounting data recorded in said purchaser record medium is not negative, delivering the primary data requested by the purchaser and the additional data, which corresponds to the requested primary data and includes two kinds of data that are purchase history data to be added owing to the purchase of the requested primary data and accounting data resulting from said accounting operation, from the software deliverer to said computer of the shop;

performing additional recording of the delivered primary data, which is requested by the purchaser, and additional data relating to the delivered primary data; and performing additional recording of data, which is the same as the delivered primary data and said additional data relating to the delivered primary data, to said computer of the software deliverer.

4. The data delivery method according to claim 3, further comprising:

transmitting a predetermined amount of money from the computer of the software deliverer to the purchaser record medium by inputting data representing the predetermined amount of money to the additional data area of the purchaser record medium when the purchaser meets service offering conditions of the software deliverer so as to offer services from the software deliverer; and recording the data representing the predetermined amount of money in said computer of the software deliverer.

5. The data delivery method according to claim 3, wherein data management is performed by said computer of the software deliverer by using an authentication function in such a manner that the purchaser cannot write data thereinto.

6. The data delivery method according to claim 3, wherein said purchaser inherent data includes data representing an age of the purchaser, wherein, in a case that an age limit is imposed to primary data to be purchased, the method further includes:

collating a limiting age with the age of the purchaser when collating the retrieved corresponding data with the additional data;

wherein if the age of the purchaser is outside a permissible range in a case of the imposed age limit, stopping delivery of the primary data.

7. The data delivery method according to claim 3, wherein said purchase history data includes data representing a title of the software, a price of the software, a name of a shop that has sold the software, a date and time at which the software is purchased, and the number of a write machine.

8. Data delivery method according to claim 3, wherein the purchaser inherent data includes data representing an ID number, a password, a date of a purchaser birth, and a distinction of sex.

9. Data delivery method according to claim 3, wherein the accounting data includes data representing a date of accounting, an amount of deposited money, an amount of paid money, a balance, and a name of a shop that has accounted.

10. A data delivery system comprising:

a computer of a software deliverer for delivering primary data including software;

a computer of a shop receiving the primary data delivered from said computer of the software deliverer through a communication network;

a purchaser record medium that is owned by a purchaser and has a primary data area for recording primary data purchased by a purchaser therein, and an additional data area for recording additional data including purchaser inherent data, purchase history data representing history of purchase of said primary data, and accounting data, and that is adapted to be able to rewrite the primary data and the additional data, which are recorded in the primary data area and the additional data area, respectively;

software-deliverer-side recording means for recording data, which is identical to the additional data to be recorded in said purchaser record medium, as original data therein;

regulating means for imposing a restriction on an operation of rewriting of original data, which is recorded in said software-deliverer-side recording means by the purchaser;

collating means for retrieving original data, which corresponds to the additional data recorded in said purchaser record medium, from said software-deliverer-side recording means, for collating the original data, which is recorded in said software-deliverer-side recording means, with the additional data which is recorded in said purchaser record medium and is sent from said computer of the shop to said computer of the software deliverer through said network, for continuing delivery of the primary data if matched, and for stopping delivery of the primary data if not matched; and control means for performing an accounting operation, which relates to the primary data to be purchased by the purchaser, when continuing the operation of delivering the primary data according to a result of collation performed by said collating means, for recording the primary data, which is delivered from said computer of the software deliverer to said computer of the shop through said network, in the primary data area of the aforesaid purchaser, and for recording the additional data, which includes the purchase history data and the accounting data to be related to the primary data purchased by the purchaser and to be added when purchasing the primary data, in the additional data area of said purchaser record medium and in the aforesaid software-deliverer-side recording means; wherein the software-deliverer-side-recording means, regulating means, collating means and control means are provided in said computer of the software deliverer.

* * * * *

UNITED STATES PATENT AND TRADEMARK OFFICE
CERTIFICATE OF CORRECTION

PATENT NO. : 6,018,720
DATED : January 25, 2000
INVENTOR(S) : Jun FUJIMOTO

It is certified that error appears in the above-identified patent and that said Letters Patent is hereby corrected as shown below:

Column 16, Claim 1, Line 33    delete "therein";

Column 17, Claim 3, Line 28    change "area,and" to --area, and--.

Signed and Sealed this

Twenty-fourth Day of April, 2001

Attest:

NICHOLAS P. GODICI

Attesting Officer    Acting Director of the United States Patent and Trademark Office